United States Patent

Sharpe

[11] 4,114,470
[45] Sep. 19, 1978

[54] RELATING TO PRESSURE FLUID OPERATED ACTUATORS

[75] Inventor: Charles William Scott Sharpe, Inchtue, Great Britain

[73] Assignee: Perenco Limited, Perth, Great Britain

[21] Appl. No.: 759,537

[22] Filed: Jan. 14, 1977

[30] Foreign Application Priority Data

Jan. 16, 1976 [GB] United Kingdom ............... 1677/76

[51] Int. Cl.² ............................................. G01H 9/00
[52] U.S. Cl. ...................................... 74/441; 74/89.15
[58] Field of Search ..................... 74/441, 409, 89.15

[56] References Cited

U.S. PATENT DOCUMENTS 2,791,128   5/1957   Geyer et al. ........................... 74/441

FOREIGN PATENT DOCUMENTS 1,129,791   5/1962   Fed. Rep. of Germany ............ 74/441

Primary Examiner—Benjamin W. Wyche
Assistant Examiner—Wesley S. Ratliff, Jr.
Attorney, Agent, or Firm—Lane, Aitken, Dunner & Ziems

[57] ABSTRACT

A rotary actuator incorporating an enclosure with a rectilineal slideway along which a slide member is movable has means at one end of the slide member for moving the member along the slideway and further means at the other end of the slide member for restraining the slide member from rotary movement; the slide member carries a screw threaded nut assembly which engages a worm screw forming a part of an output shaft which is rotated when the slide member slides.

6 Claims, 5 Drawing Figures

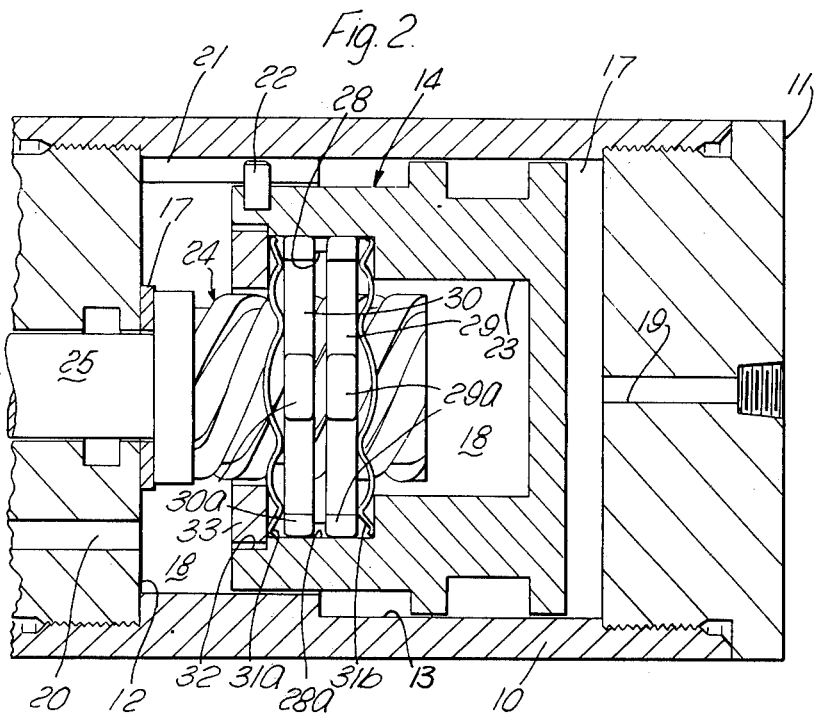
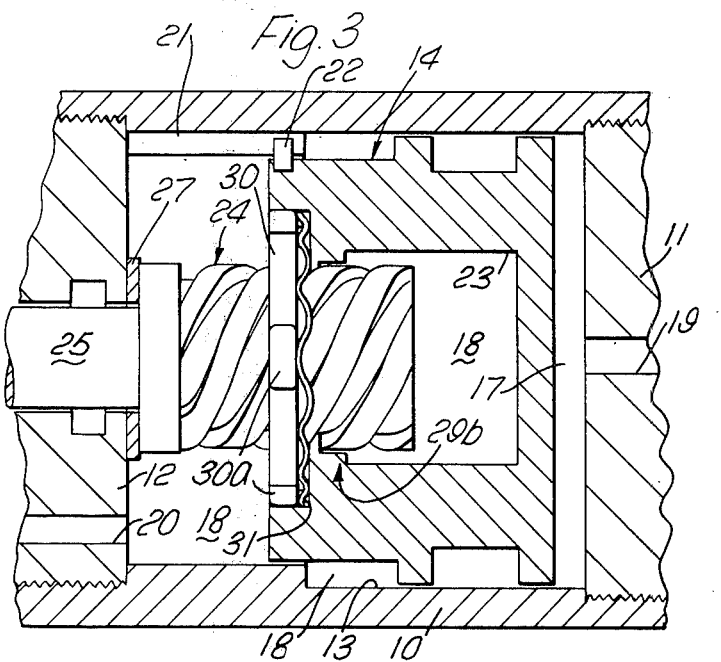

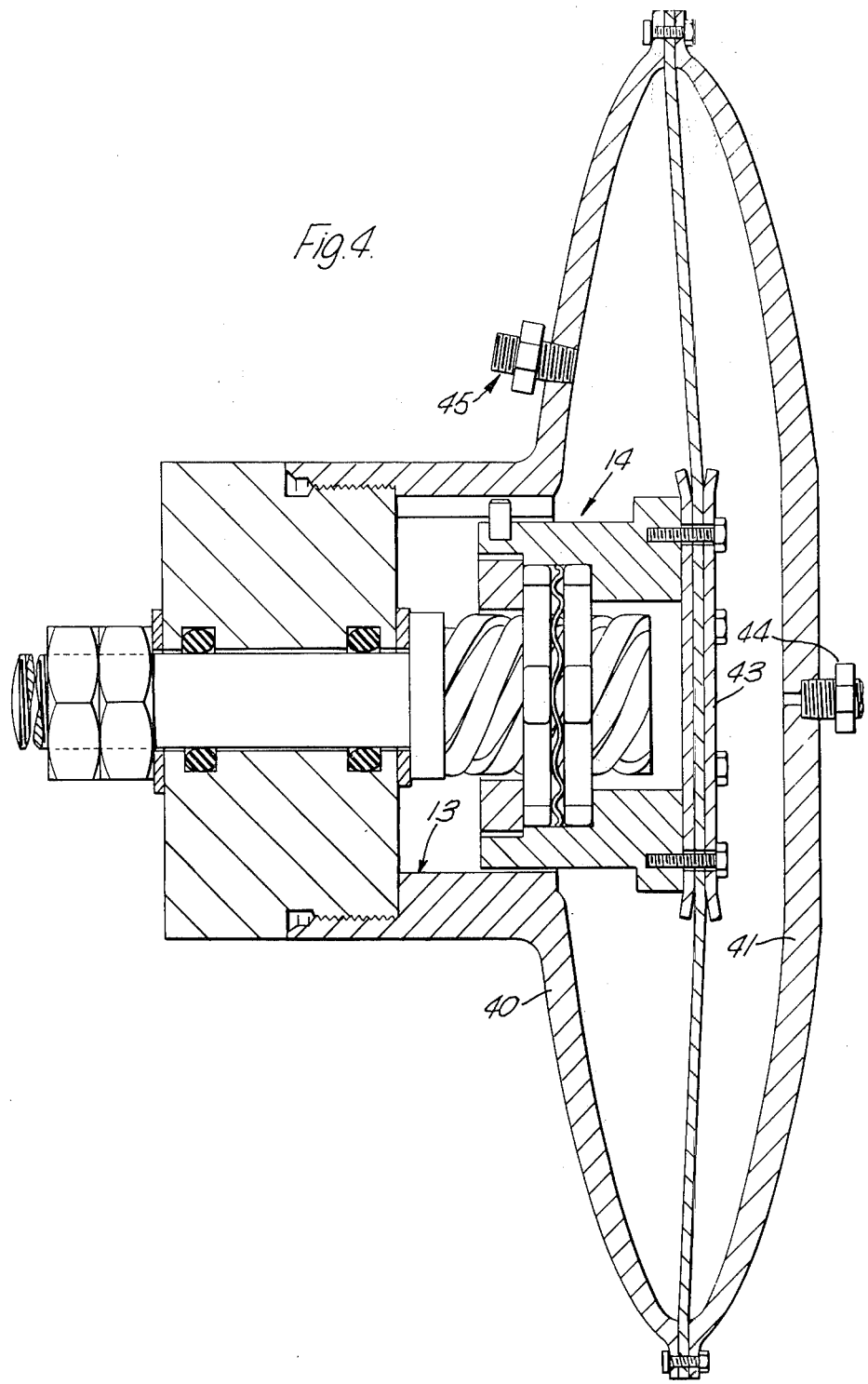

RELATING TO PRESSURE FLUID OPERATED ACTUATORS

This invention relates to rotary actuators.

According to the present invention, there is provided a rotary actuator comprising an enclosure having an internal rectilineal slideway along which a slide member is movable, said slide member being formed by a hollow body extending longitudinally of the slideway, first means for moving the slide member along the slideway, second means restraining the slide member from rotating during movement along the slideway, a shaft extending into the enclosure and being rotatable relative to the enclosure, the shaft axis extending longitudinally of the slideway, a worm screw carried within the enclosure by the shaft and a screw-threaded nut assembly carried by said slide member, said nut assembly and worm screw being arranged mutually to interact so that the shaft rotates when the slide member moves along the slideway, and wherein said second means is formed by a protrusion on the body of said slide member engaging a groove in the wall of the enclosure, said protrusion being located at the opposite end of the hollow body from said first means, said nut assembly is releasably mounted within said hollow body and is constrained against rotational movement, and said nut assembly comprises first and second nut elements each threadedly mounted on said worm screw and urged in mutually opposite directions by one or more springy elements.

In one embodiment movement of said slide member is effected hydraulically, and said first means incorporates a piston member integral with said hollow body and slidable in a fluid-tight manner along a cylinder formed within said enclosure, and said shaft extends into said enclosure through a fluid-tight seal, means being provided for admitting and exhausting hydraulic fluid from at least one of the chambers formed within the cylinder on opposite sides of said piston member.

In another embodiment movement of said slide member is effected pneumatically, and said first means incorporates a flexible diaphragm which is sealingly secured along its outer periphery to said enclosure, and said shaft extends into said enclosure through a pneumatic seal, means being provided for admitting and exhausting air or other gas from at least one of the chambers formed within the enclosure on opposite sides of said diaphragm.

In a further embodiment movement of said slide member is effected electro-magnetically, and said first means incorporates an armature member the outer peripheral portion of which extends between first and second spaced-apart windings mounted within said enclosure.

Preferably the nut assembly incorporates a plurality of lugs extending radially with respect to said shaft axis and said lugs are respectively received in channels in said hollow body member.

Conveniently, the nut assembly is held against axial movement with respect to said hollow body by means of a clamp ring connected to said slide member by means of screw threads.

Embodiments of the present invention will now be described, by way of example, with reference to the accompanying drawings in which:

FIG. 2 illustrates a modification of a detail of FIG. 1;

FIG. 3 illustrates an alternative modification of the same detail of FIG. 1;

FIG. 4 is a sectional elevation of a second form of rotary actuator in accordance with the present invention.

Figure 1:
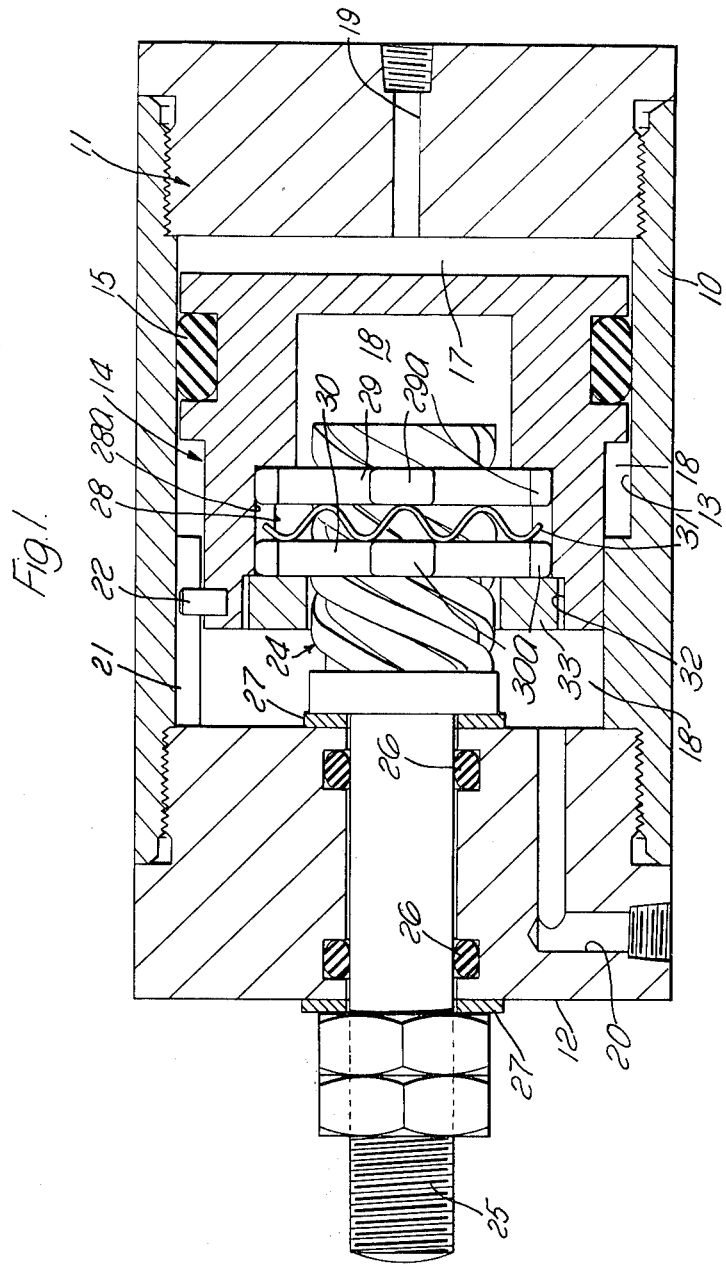
FIG. 1 is a sectional elevation of a first form of rotary actuator in accordance with the present invention.

In FIG. 1 of the drawings, an enclosure in the form of a cylinder 10 with end caps 11 and 12 has an internal rectilineal slideway 13 constituted by the inner wall surface of the cylinder 10. The slideway 13 is engaged by a slide member 14, having an annular seal which effectively divides the space within the cylinder 10 into two chambers 17 and 18 of variable volume. Passages 19 and 20 in the end caps 11 and 12 respectively provide a means for admitting and exhausting a fluid to and from the chambers 17 and 18 so that the member 14 can be moved in either direction along the slideway 13 by fluid pressure, for example a hydraulic oil supplied from an external power unit (not shown).

The inner wall surface of the cylinder 10 is stepped, the larger diameter portion forming the slideway 13 and the smaller diameter portion incorporating a groove or slot 21 which lies parallel with the slideway 13. A pin 22 set in the member 14 runs in the slot 21 to restrain the member 14 from rotating.

The slide member 14 is in the form of a hollow body the innermost portion 23 of which provides accommodation for the inner end portion of a worm screw 24 formed on a rotatable output shaft 25 which is journalled in the end cap 12 and extends into the chamber 18 through oil seals 26, the shaft 25 being located axially against thrust washers 27. A recess portion 28 of the hollow member 14 releasably accommodates two nuts 29 and 30 each of which engages the worm screw 24. Each nut 29, 30 has four equi-spaced outwardly-protruding lugs, 29a and 30a respectively, which engage mating slots 28a in the recess portion 28 to restrain the nuts from rotating relatively to the slide member 14. The nuts 29, 30 are urged in opposite axial directions, mutually apart in this embodiment, by means of a springy element in the form of a resilient spacer 31 of spring steel. Since the nuts 29, 30 cannot rotate, the spacer 31 "de-pitches" the nuts on the worm screw 24; that is to say, the algebraic total of clearances between the nuts 29, 30 and the worm screw 24 in the axial direction is reduced to zero. The outermost portion 32 of the hollow body 14 is internally screw-threaded and accommodates an externally screw-threaded collar 33 the opening in which clears the worm screw 24. The collar 33 is adjusted axially so that there is no lost motion between the member 14 and the assembly of the nuts 29, 30. It is important in this embodiment that the collar 33 should not be screwed in so far as to change the positional relationship between the nuts 29, 30 in the axial direction as determined by the spacer 31.

Within output loading limits determined by the force exerted by the spacer 31, movement of the slide member 14 along the slideway 13 produces an immediate rotary response at the output shaft 25 in both directions and on change of direction. Backlash is eliminated or minimised by virtue of the nut assembly, and because the pin 22 is at the axially opposite end of the member 14 from the seal 15 the slideway 13 is not degraded by mechanical interference with the pin 22. Also, because the nut assembly is releasable manufacture of the actuator is relatively simple and in the event of wear occurring the worn parts can be replaced individually.

In FIG. 2, the nuts 29, 30 are urged in directions opposite to those in the FIG. 1 embodiment; that is, they are urged towards one another by "de-pitching" spacers 31a and 31b. In this case, the "de-pitching +" force exerted on the nuts 29, 30 by the spacers 31a, 31b acts on the collar 33 and on the recess shoulder adjacent the innermost recess portion 23. Thus, the "de-pitching" force in this embodiment may be adjusted by screwing the collar 33 into or out of the recess portion 32 as desired.

In FIG. 3, the outermost recess portion 32 and the collar 33 are dispensed with, and the separate nut 29 is replaced by an internally worm-screw-threaded portion 29b formed integrally with the slide member 14 adjacent the innermost recess portion 23. The "de-pitching" spacer 31 urges the nut 30 and the portion 29b apart in the manner and with the effect described with reference to FIG. 1.

In a second form of actuator shown in FIG. 4, the enclosure incorporates a bell portion 40 which is bolted to a cover 41 which acts as a peripheral clamping device for a flexible diaphragm 42. The diaphragm 42 is also clamped by a plate 43 to a slide member 14 which is slidable along a slideway 13 in the manner previously described. The slide member 14 is moved axially by means of pneumatic pressure applied to the diaphragm 43 by way of ports 44, 45.

Figure 5:
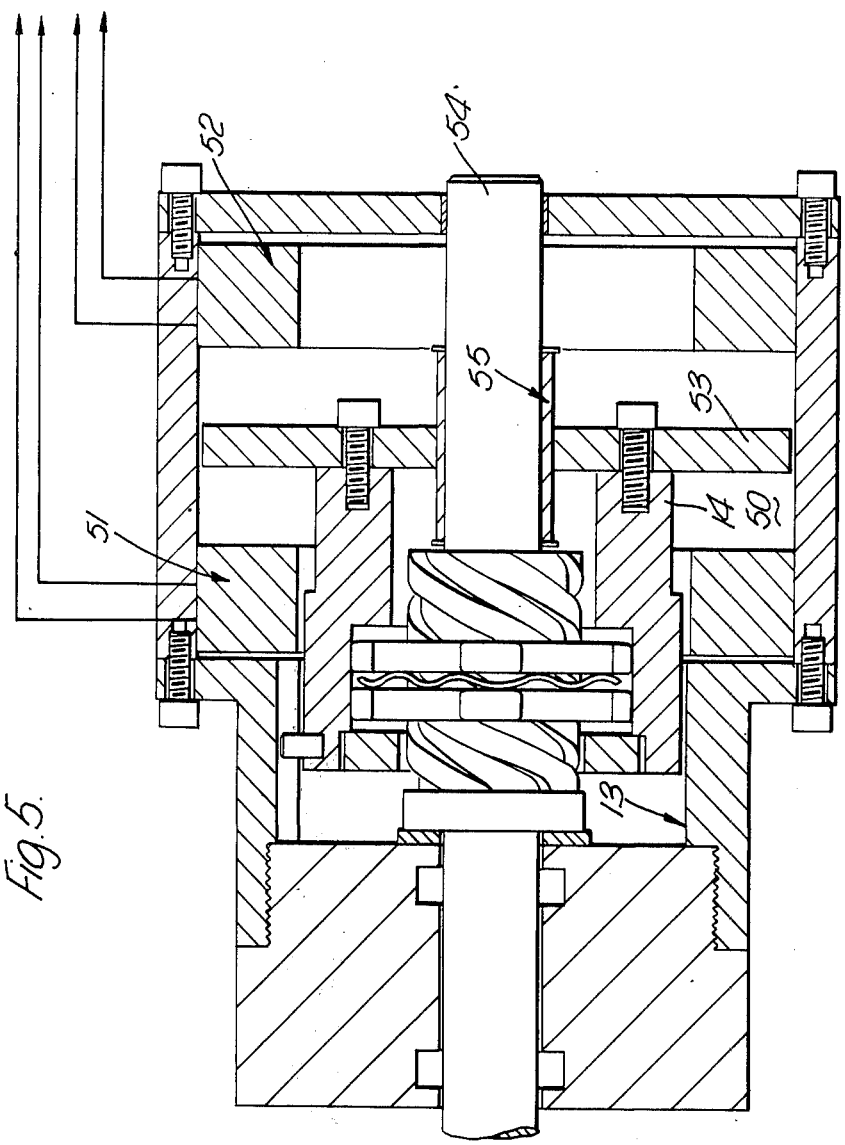
FIG. 5 is a sectional elevation of a third form of rotary actuator in accordance with the present invention.

In a third form of actuator shown in FIG. 5 the enclosure has a chamber 50 within which first and second electromagnetic coils 51, 52 are housed, the coils being spaced apart and on opposite sides of a plate 53 made of magnetic material and secured to the slide member 14 which is slidable along the slideway 13. In this actuator the shaft 25 includes a projection 54 beyond the worm screw 24 and which is journalled in the enclosure. The plate 53 is slidably mounted on a ptfe bearing 55 secured to the projection 54. The slide member 14 is moved axially by d.c. or a.c. electric power fed to one or other of the coils 51, 52.

It will be understood that the modifications described in relation to FIGS. 2 and 3 can be applied to the actuators of FIGS. 4 and 5.

I claim:

1. A rotary actuator comprising
   an enclosure having an internal rectilineal slideway along which a slide member is movable, said slide member being formed by a hollow body extending longitudinally of the slideway,
   first means for moving the slide member along the slideway, second means restraining the slide member from rotating during movement along the slideway,
   a shaft extending into the enclosure and being rotatable relative to the enclosure, the shaft axis extending longitudinally of the slideway,
   a worm screw carried within the enclosure by the shaft and a screw-threaded nut assembly carried by said slide member, said nut assembly and worm screw being arranged mutually to interact so that the shaft rotates when the slide member moves along the slideway, and wherein
   said second means comprising one of the slide member body and enclosure wall including a protrusion projecting therefrom and the other including a groove extending longitudinally relative to the slideway for receiving and cooperating with the protrusion,
   said nut assembly is releasably mounted within said hollow body, means for constraining the nut assembly against rotational movement,
   said nut assembly comprising first and second nut elements each threadedly mounted on said worm screw, at least one of the nut elements having limited axial movement relative to the worm gear and to the other nut element, and means for urging at least one of the nut elements in a direction axially opposite the other nut element for minimizing rotational backlash between the worm screw and the nut assembly.

2. An actuator as claimed in claim 1, wherein the protrusion projects from the slide member body and the groove is formed in the enclosure wall and movement of said slide member is effected hydraulically, and said first means incorporates a piston member integral with said hollow body and slidable in a fluid-tight manner along a cylinder formed within said enclosure, and said shaft extends into said enclosure through a fluid-tight seal, means being provided for admitting and exhausting hydraulic fluid from at least one of the chambers formed within the cylinder on opposite sides of said piston member.

3. An actuator as claimed in claim 1, wherein movement of said slide member is effected pneumatically, and said first means incorporates a flexible diaphragm which is sealingly secured along its outer periphery to said enclosure, and said shaft extends into said enclosure through a pneumatic seal, means being provided for admitting and exhausting air or other gas from at least one of the chambers formed within the enclosure on opposite sides of said diaphragm.

4. An actuator as claimed in claim 1, wherein movement of said slide member is effected electro-magnetically, and said first means incorporates an armature member the outer peripheral portion of which extends between first and second spaced-apart windings mounted within said enclosure.

5. An actuator as claimed in claim 1 wherein said nut assembly incorporates a plurality of lugs extending radially with respect to said shaft axis and said lugs are respectively received in channels in said hollow body member.

6. An actuator as claimed in claim 1 wherein said nut assembly is held against axial movement with respect to said hollow body by means of a clamp ring connected to said slide member by means of screw threads.

* * * * *